2 Sheets—Sheet 1.

F. BERNER, Jr.

Assignor to THE ART EMBOSSING MACHINE COMPANY.

EMBOSSING MACHINE.

No. 11,208. Reissued Dec. 8, 1891.

Witnesses:
H. P. Hood.
C. M. Hood.

Inventor:
Friedrich Berner Jr.

2 Sheets—Sheet 2.

F. BERNER, Jr.

Assignor to THE ART EMBOSSING MACHINE COMPANY.

EMBOSSING MACHINE.

No. 11,208. Reissued Dec. 8, 1891.

Witnesses:
H. P. Hood,
C. M. Hood.

Inventor:
Frederick Berner Jr.

UNITED STATES PATENT OFFICE.

FREDRICH BERNER, JR., OF INDIANAPOLIS, INDIANA, ASSIGNOR TO THE ART EMBOSSING MACHINE COMPANY, OF SAME PLACE.

EMBOSSING-MACHINE.

SPECIFICATION forming part of Reissued Letters Patent No. 11,208, dated December 8, 1891.

Original No. 456,079, dated July 14, 1891. Application for reissue filed October 5, 1891. Serial No. 407,793.

*To all whom it may concern:*

Be it known that I, FREDRICH BERNER, Jr., of Indianapolis, county of Marion, and State of Indiana, have invented certain new and useful Improvements in Embossing-Machines; and I do hereby declare that the following is a full, clear, and exact description thereof, reference being had to the accompanying drawings, in which like figures refer to like parts.

My invention relates to an improvement in that class of embossing-machines in which the embossing-die is cylindrical, is mounted upon a revoluble shaft supported in adjustable bearings, and is heated to a high temperature when in use. It has been found difficult in this class of machines to provide suitable bearings for the die-shaft, which will not be injuriously affected by the heating and consequent expansion to which the die-shaft is necessarily subjected.

The object of my improvement is therefore, first, to provide bearings for the die-shaft which will properly support the die-shaft and will allow the shaft to revolve freely at any temperature without binding or cutting its bearings, and, second, to provide means for the vertical, the longitudinal, and the rotary adjustment of the die-shaft when heated, all as hereinafter fully set forth.

Figure 1:
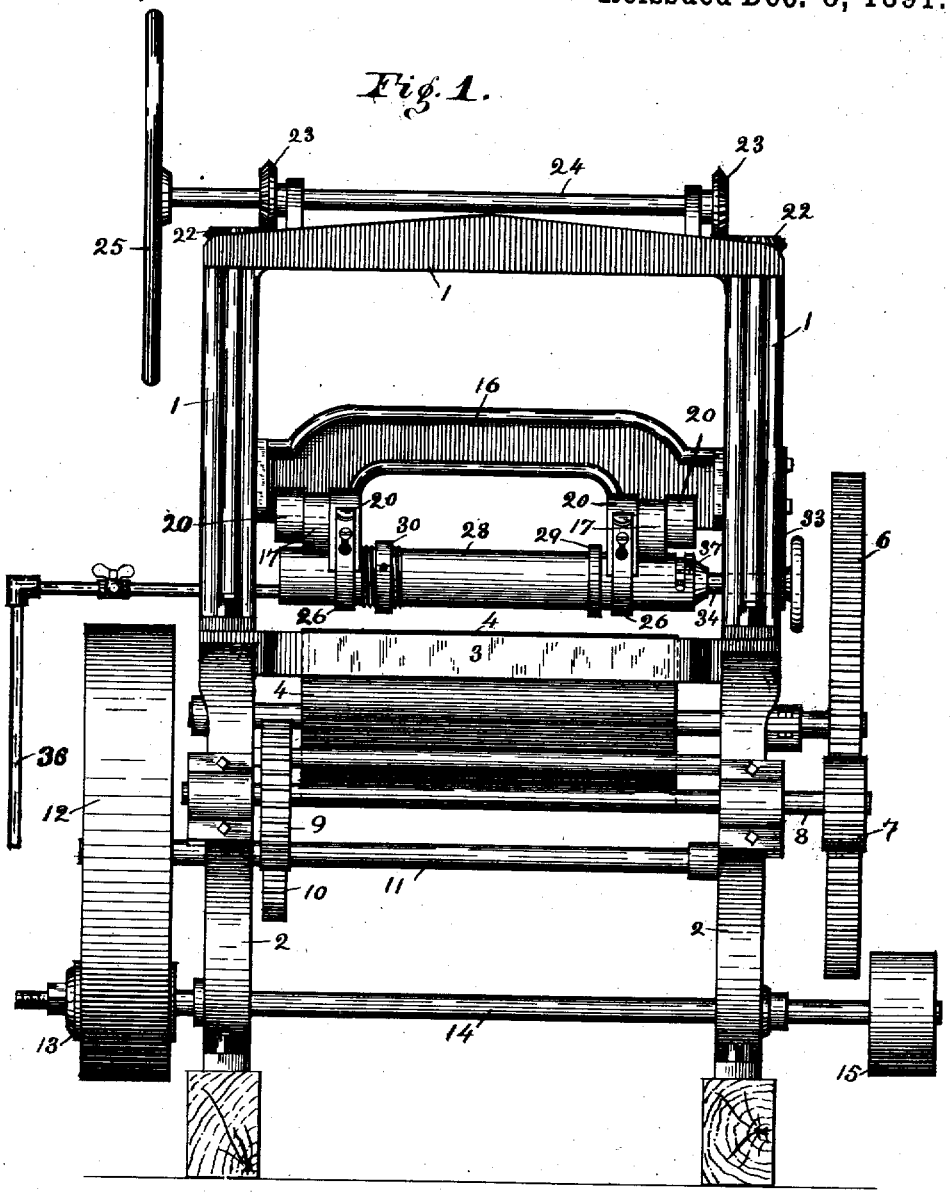
Figure 5:
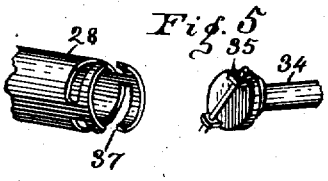
Figure 2:
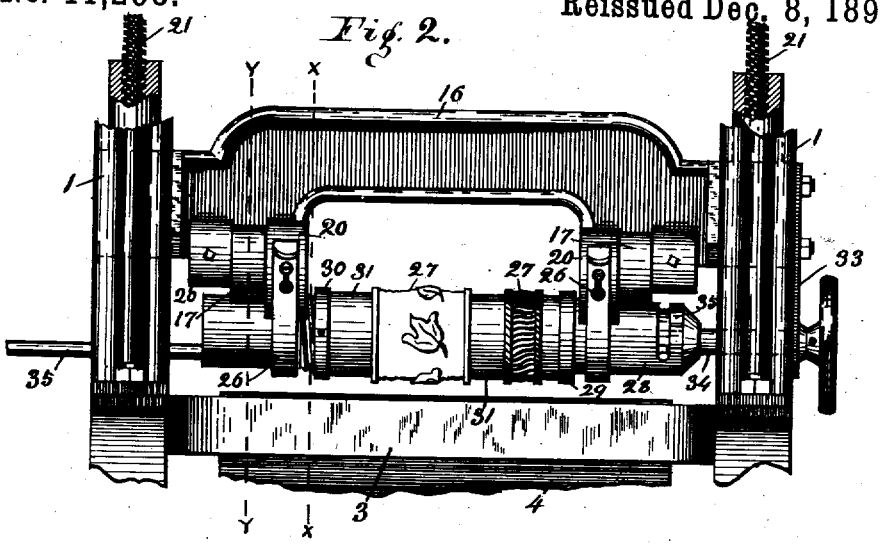
Figure 3:
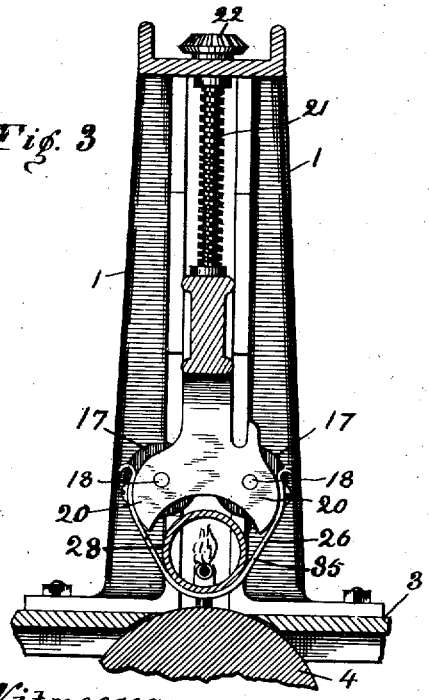
Figure 4:
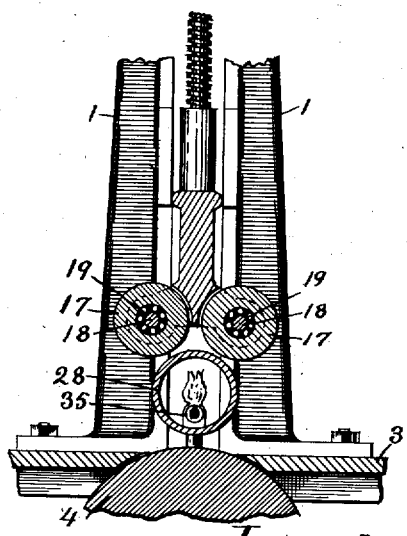

In the drawings, Figure 1 is an end elevation of an embossing-machine with my improvements thereon. Fig. 2 is an enlarged elevation of the upper end of the machine, showing the embossing-dies set in position upon the shaft. Fig. 3 is a sectional view on the line *x x*, Fig. 2, looking to the left. Fig. 4 is a similar view on the line *y y*, Fig. 2. Fig. 5 is a perspective view of the right-hand end of the shaft, showing the notches and the inner end of the chuck with its pin that engages with such notches.

In detail, 1 is the upper part of the frame-work, and 2 the lower, 3 being the platen or table.

4 is the feed-roll located beneath the table, its upper surface passing through the same. This feed-roll is mounted on a shaft 5, having bearings in the sides of the lower frame-work 2. On its outer end is mounted a gear-wheel 6, engaging with a pinion 7, mounted on the shaft 8, also having bearings in the lower frame, and near the opposite end of this shaft is a pinion 9, engaging a pinion 10, mounted on a shaft 11, which carries on its outer end the fly-wheel 12, the latter being driven by the friction-roll 13, mounted on the shaft 14, on the outer end of which is mounted a driving-pulley 15. Power being applied to this pulley drives the friction-roll and through it the fly-wheel, and the power thus acquired is transmitted through the pinions to the feed-roll.

In the upper part of the frame-work 1 and adapted to slide therein is a central cross-head 16. At each end of the cross-head, on its under side, I mount a pair of friction-wheels 17 to form rolling bearings for the die-shaft. Said wheels are arranged on opposite sides of the vertical center of the cross-head and are supported on spindles 18, which pass through projections 20 on the cross-head. Wheels 17 are provided with central openings of considerably larger diameter than the spindles, and in the annular space thus formed between the spindle and the wheel I place a series of anti-friction rolls 19. By this construction the wheels 17 revolve easily without binding or cutting when heated to a high temperature.

21 21 are screw-rods working easily in threaded projections on the upper side of this cross-head, these screw-rods supported in the upper frame-work 1 and having on their upper ends the beveled gears 22, which engage with similar gears 23 on the cross-rod 24, which has bearings on the top of the frame-work 1.

At one end of the rod 24 is a hand-wheel 25 for turning the same, which either raises or lowers the cross-head and regulates the pressure of the embossing-dies.

Removably attached to the boxings 20 are metal straps 26, which support a hollow metal die-shaft 28, upon which the embossing-dies 27 are mounted. Straps 26 are so arranged as to allow the die-shaft, when not in action, to fall away from the friction-wheels 17 a short distance, as clearly shown in Figs. 3 and 4, so that the heat from the shaft is not directly communicated to the wheels.

29 is a collar formed integral with this shaft, and 30 is a removable collar working on a screw-threaded portion of the shaft, between which and the stationary collar 29 the embossing-dies 27 are mounted, together with the spacing-rings 31, which being of different width the dies can be set at any desired position and locked by the collar 30.

33 is a downwardly-projecting bracket attached to one side of the cross-head 16, through the lower end of which passes the spindle 34, carrying a clutch or locking head 35 on its inner end, which is adapted to loosely enter and engage with notches 37 in the end of the shaft 28. This spindle is used for turning the shaft when hot to any desired position for starting, and, having a stationary bearing in the bracket 33, which, when locked to the die-shaft 28, will prevent any lateral movement of the same, also dispenses with the use of bearing-rings on such shaft, which, as before stated, is only sustained loosely by the straps 26; but when a board or any other article that is to be embossed is passed between it and the feed-roll 4 the embossing-shaft is forced upward in contact with the friction-wheels 17, against which it bears and is revolved until the work is finished.

36 is a pipe which supplies gas or oil to feed a flame within the die-shaft 28 and heat the same.

By removing the dies 27 and rings 31, and putting on a brass roll when heated, it may be used for a burnisher, either before or after embossing.

It is obvious that the device herein shown and described for mounting and suspending the embossing-shaft, preventing its lateral movement, the arrangement of the friction-wheels with anti-friction bearings in a movable cross-head and bringing them in contact with the embossing-shaft when the latter is forced upward by contact with the wood, and means for adjusting the pressure of the die upon the material, are as well adapted to a solid as a hollow shaft, and I do not intend to limit myself to their use upon either kind of shaft.

What I claim as my invention, and desire to secure by Letters Patent, is the following:

1. In a wood-embossing machine, the combination of the main frame, the feed-roll mounted therein, the vertically-adjustable cross-head arranged above said feed-roll and having at each end a pair of friction-wheels mounted therein, the die-shaft, and the pair of straps secured to the cross-head and arranged to suspend the die-shaft below and between the friction-wheels, whereby the friction-wheels form bearings for the die-shaft when it is in action, and the straps form a support for said shaft when at rest, substantially as set forth.

2. In a wood-embossing machine, a hollow shaft, circular dies removably mounted thereon, a burner inside such shaft connected to a pipe leading to a fuel-supply, one end of such shaft carried by a clutch connected to a spindle having bearings in a bracket or support on a movable cross-head in the frame, and straps for suspending such shaft near the opposite end and intermediate between it and the bearing of the spindle, such straps detachably connected to the cross-head, all combined substantially as shown and described.

3. In a wood-embossing machine, a hollow embossing-shaft supported at one end by a spindle having bearings in a cross-head movable vertically in the frame-work, such embossing-shaft further supported by straps detachably connected to such cross-head, friction-wheels forming bearings for the embossing-shaft journaled in such cross-head, and means, such as screw-rods, connected to the cross-head and through pinions to a horizontal counter-shaft having a hand-wheel for adjusting the pressure of the embossing-dies upon the wood, in combination with a heating-burner located inside the shaft, and a feed-roll carried in the frame below the embossing-shaft, substantially as shown and described.

4. In a wood-embossing machine, a frame-work, an adjustable cross-head movable vertically therein, an embossing-shaft suspended from such cross-head, and friction-wheels journaled in such cross-head on anti-friction bearings above such embossing-shaft and adapted to contact therewith and form bearings for such shaft when the latter is forced upward by contact of the dies with the wood to be embossed, in combination with a feeding-roll carried below the embossing-shaft in the frame-work, substantially as shown and described.

5. In a wood-embossing machine, a frame-work, a feed-roll having bearings therein, mechanism for driving the feed-roll, a cross-head movable vertically in the uprights of the frame above the table, a hollowing embossing-shaft heated from within, dies removably mounted thereon, such shaft suspended by straps from a vertically-moving cross-head and detachably connected at one end to a spindle having bearings in such cross-head, whereby the lateral movement of the shaft is prevented, and friction-wheels journaled in bearings upon the cross-head above the embossing-shaft and having anti-friction bearings adapted to contact with the periphery of such shaft when the latter is forced upward by its operation upon the wood, with means for raising or lowering the cross-head and its connecting parts for regulating the pressure of the dies upon the material, all combined substantially as shown and described.

In witness whereof I have hereunto set my hand this 24th day of September, 1891.

FREDRICH BERNER, JR.

Witnesses:
H. P. HOOD,
V. M. HOOD.